United States Patent [19]

Morette

[11] Patent Number: 4,580,202

[45] Date of Patent: Apr. 1, 1986

[54] ADJUSTABLE SUPPORT FOR OPTICAL UNIT OF THE HEADLIGHT OF AN AUTOMOTIVE VEHICLE

[76] Inventor: Jacques Morette, "Les Cottages", 76380 Montigny, France

[21] Appl. No.: 553,109

[22] Filed: Nov. 18, 1983

[30] Foreign Application Priority Data

Nov. 19, 1982 [FR] France ................... 82 19461

[51] Int. Cl.⁴ ............................................. F21V 21/14
[52] U.S. Cl. ....................................... 362/273; 362/83; 362/274; 362/418
[58] Field of Search .................. 362/80, 83, 269, 273, 362/274, 306, 418

[56] References Cited

U.S. PATENT DOCUMENTS

| | | | |
|---|---|---|---|
| 3,848,121 | 11/1974 | Colucci | 362/419 |
| 4,412,275 | 10/1983 | McMahan | 362/83 X |
| 4,491,901 | 1/1985 | Sigety, Jr. | 362/83 X |

FOREIGN PATENT DOCUMENTS 563868  9/1958  Canada ........................ 362/274

*Primary Examiner*—Tony M. Argenbright
*Attorney, Agent, or Firm*—Mason, Fenwick & Lawrence

[57] ABSTRACT

The support comprises dismountable fixing means for mounting the optical unit on an annular member, which are provided as members made of rigid and resilient wire, each one comprising a linear portion forming a rotation axis, engaged within a corresponding bearing provided in the peripheral portion of the annular member, and two extensions extending on either side from the linear portion and bent transversely with respect to the latter one of the extensions called "inner extension" corresponding to the inner edge of the annular member and being provided at its end with a hook which can be resiliently engaged below said edge in view of its locking, while the other extension called "outer extension" carries at its end a bent portion oriented towards the central portion of the annular member when the inner extension is in the locking position, and the outer extension being, in this position, in close-contact with the outer face of the optical unit.

13 Claims, 6 Drawing Figures

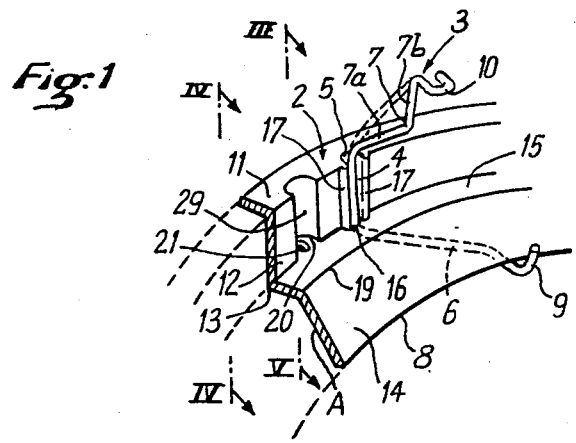
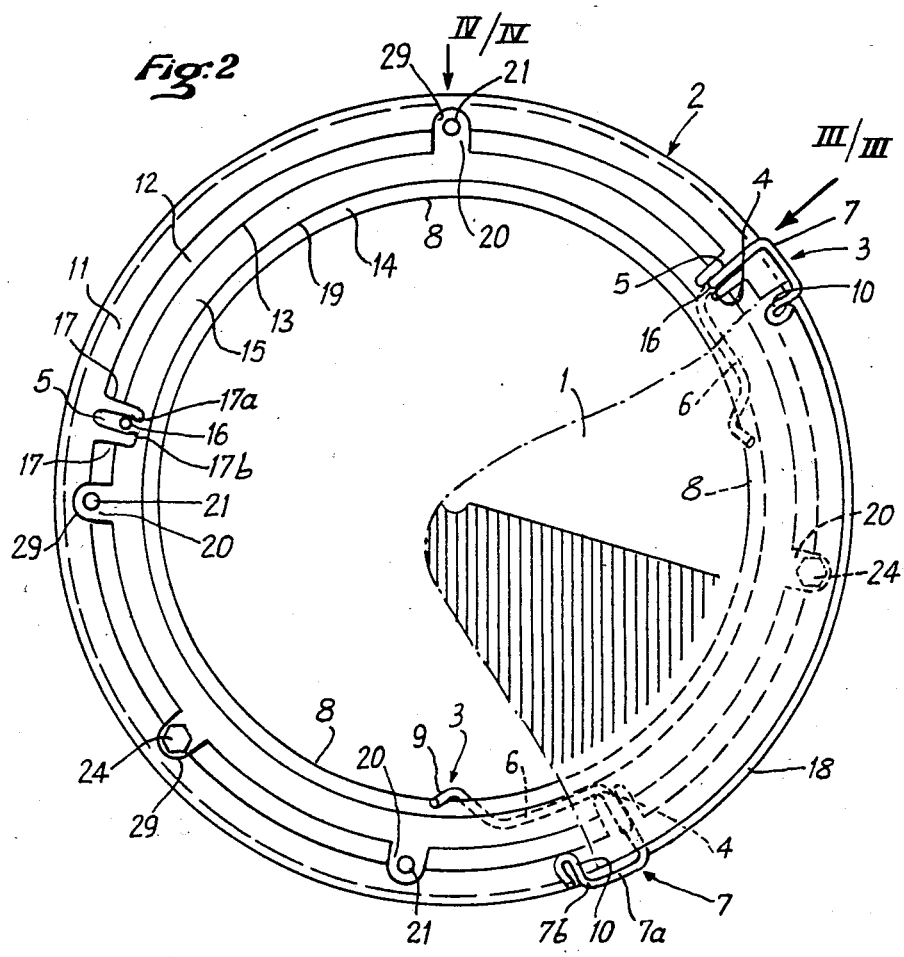

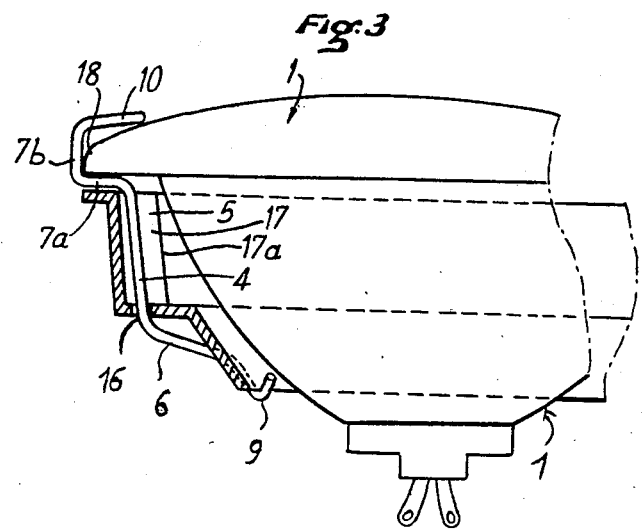
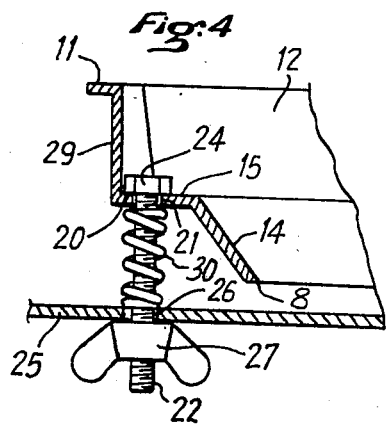
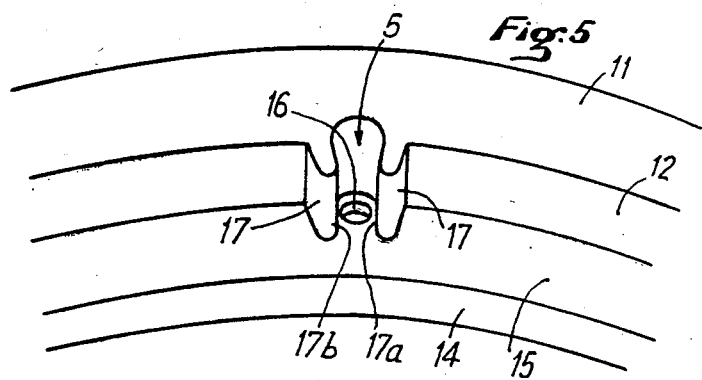

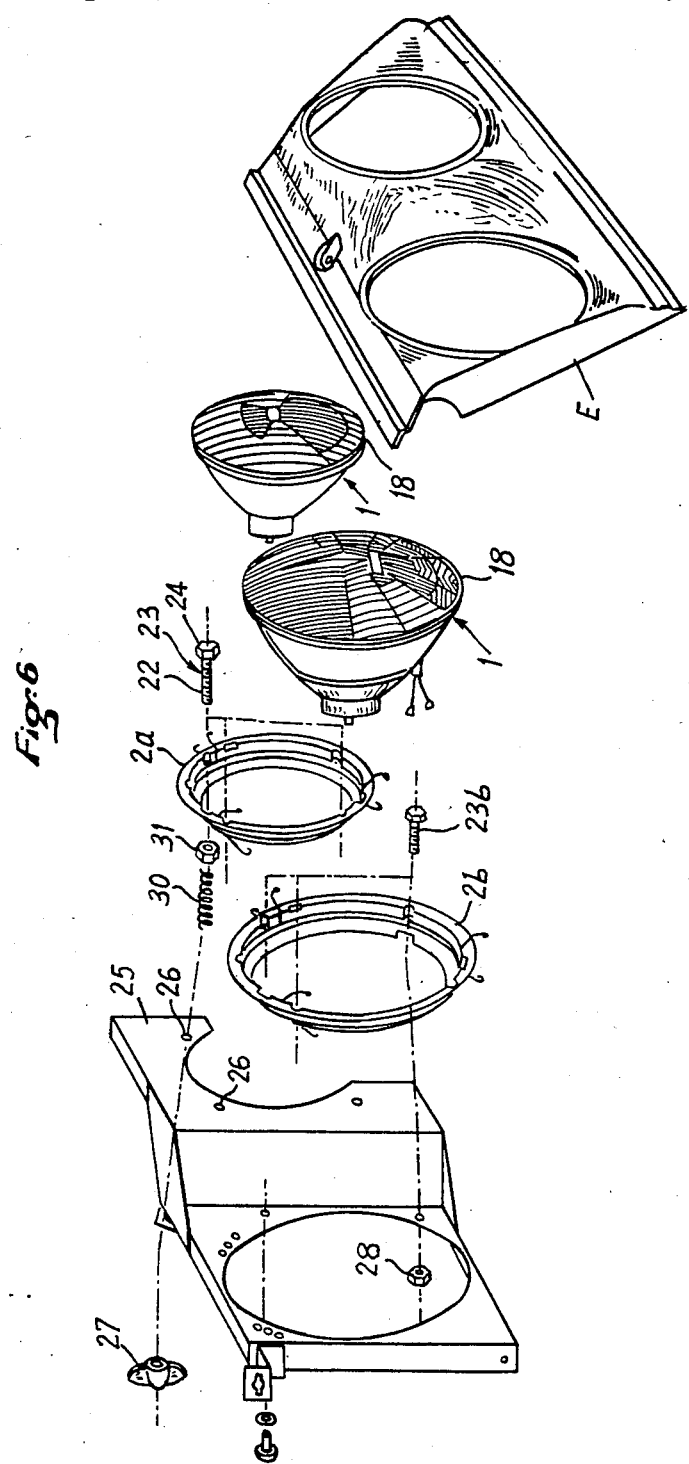

ADJUSTABLE SUPPORT FOR OPTICAL UNIT OF THE HEADLIGHT OF AN AUTOMOTIVE VEHICLE

The invention relates to a support for an optical unit for headlights of an automotive vehicle.

A certain number of such supports are known in which generally the optical unit is releasably mounted on a cup shaped annular member, truncated in the vicinity of its apex, to allow the introduction on the rear end of the optical unit which carries the electrical connection means and, possibly, the means allowing the replacement of the light source itself.

Generally the optical unit is fixed to the cup shaped member via a metallic ring of appropriate profile by means of screws whose heads, facing towards the exterior, cooperate with the outer face of the ring while their threaded portions cooperate with corresponding threaded bores provided in a rim of the cup shaped member. The fixing screws are generally of small size for aesthetical reasons and, while their mounting at the factory do not incur major difficulties, the situation of an individual user is quite different when he is obliged to replace one of the optical units in case of failure. In fact, when also taking into account the vertical position of the mounting ring on the vehicle, it can be said that this operation is actually an "exploit" when the user has no specific tools at his disposal, which is generally the case.

Besides, in these devices, the cup shaped member is connected to the vehicle body by means of a supporting bracket which is fixed to the vehicle body by means of threaded stems of adjustable length, as already known, which cooperate with corresponding threaded openings provided in the supporting bracket while their distal ends facing towards the exterior and provided with the holding means are restrained from longitudinal movement, by example by means of a groove which overlaps the two faces of the rim of the annular member. This arrangement is intended to allow the adequate setting of the axis of the opical unit in terms of parallelism and slope with respect to the main axis of the vehicle. The locking against rotation of the threaded stem or of its adjusting nut is then achieved either by a set of check nuts, or by a pressure spring acting between the internal face of the supporting bracket provided with the threaded opening, which allows the adjusting, and the head of the stem which is located beyond the bracket towards the interior of the vehicle.

It is clear that a device of this kind ensures a rigid connection between the optical unit and the vehicle body which causes the destruction of the unit as a consequence of a shock, even of small amplitude, between the unit and a vehicle situated in front of it.

The invention permits to overcome these drawbacks by proposing an annular member provided with fast acting fixing means for the optical unit and with adjusting means for adjusting the slope of the optical unit, which are designed in such a manner so as to define a resilient connection between the annular member which is solid with the optical unit and the supporting bracket, the annular member being adjustably mounted on the latter, the supporting bracket being possibly provided merely as a component of the vehicle body.

More precisely, the support for optical unit according to the invention is remarkable in that the releasable means for fixing the optical unit to the annular member are comprised of a plurality of members made of rigid and resilient wire, spaced along the peripheral portion of the annular member, each said members comprising a linear portion defining a rotation axis inserted into a corresponding bearing provided in said peripheral portion substantially perpendicularly to the the main plane of the annular member; and two extensions extending from both ends of said linear portion, which extensions are bent transversely with respect to the latter and located substantially in a same plane containing the linear portion, one of said extensions, termed "inner extension" corresponding to the side of the annular member which is intended to be oriented towards the interior of the vehicle being provided at its free end with a hook-like elbow facing towards the exterior and designed for engagement below said side and bearing thereagainst under a resilient force in view of it locking with respect to this side, while the other extension, termed "outer extension" carries at its free end a curved portion oriented towards the central portion of the annular member when the inner extension is in the above-defined locking position, and shaped so as to be, in this position, in close contact with the outer face of the optical unit for which it constitutes thus one of the retaining members.

Other features will appear upon reading the following description of an embodiment of the invention, with reference to the attached drawings, wherein:

FIG. 1 is a partial perspective view of the annular member in the zone of one of the retaining means and one of the adjustment means, with a section along an axial plane A, FIG. 2 is a front view of the annular member and the optical unit partly cut away, some of the heads of the fixing and adjusting screws being omitted for a better understanding of the drawing, FIG. 3 is a section view taken along the axial plane III—III of FIGS. 1 and 2, with a diagrammatic view of the optical unit, FIG. 4 an axial section view of the annular member along line IV—IV of FIGS. 1 and 2, with a diagrammatic view of the supporting bracket solid with the vehicle body, FIG. 5 is an enlarged partial view of the annular member in the zone of one of the bearings for the rotation axis of the fixing means, et FIG. 6 is an exploded view of a set of two headlights provided with optical unit supports according to the invention.

On the drawings, 1 designes the optical unit which incorporates in a classical manner, as a unitary assembly, the light source, the parabolic reflector and the front glass which, in the exemple, comprises the peripheral edge 18 of the optical unit. The optical unit is maintained by fixing means which will be described in detail here after, fixed to an annular member 2 which is mounted so as to be adjustable angularly with respect to the main axis of the vehicle on a bracket 25 which can be integral with the body of the vehicle but which can also be mounted adjustably with respect to the body in the same manner and by similar means (the two corresponding annular members shown in FIG. 6 are respectively designated by references 2a and 2b).

Each optical unit is fixed to the corresponding annular member 2 by dismountable fixing means comprised of at least 3 components made of rigid and resilient metallic wire suitably curved, so as to present, on either side of a central linear portion forming an axis of rotation 4, two extensions 6,7, bent transversely to the latter and situated substantially in a same plane and, in the example, extending on the same side of the rotation axis.

The annular member 2, which is made of cast plastics slightly deformable resiliently, comprises, starting from its outer edge 11 oriented towards the front in a plane substantially perpendicular to the axis of the vehicle, two slightly frusto-conical walls, the first wall being adjacent to the edge 11 and called "front-wall" 12 while the other, called "rear-wall" 14, follows the first wall in direction of the interior of the vehicle and is connected to the first wall by means of a diametral portion of wall 15 forming a step.

The step 15 extends from the edge 13, oriented towards the interior, of the "front-wall" 12, this edge 13 being of larger diameter than the diameter of the front edge 15 of the "rear-wall" 14 which follows the latter.

The step 15 is provided with a plurality of openings 16 which correpond to the various spacing patterns which may be contemplated for the fixing means spaced at the periphery of the optical unit as stated above. On either side of each opening 16, the "front-wall" 12 is provided with two ribs 17 intended to receive the rotation axis 4 and to define thus a bearing 5 for the latter.

Preferably the edges 17a, 17b of each pair of corresponding ribs 17 are shaped so as to slightly converge towards each other and to leave between them a slot whose width is slightly lower than the cross section of the axis 4 whereby the axis may be engaged forcibly within the slot against the resilient deformation of the ribs.

Due to the fact that the openings 16 are provided only in the thin wall of the step 15 the mounting of the fixing member 3 is quite simple; this mounting is effected firstly by engaging into the opening 16, by example, the end of the interior extension of the fixing member until the linear portion forming the rotation axis 4 is located in the vicinity of the bearing 5; thereafter the linear portion is engaged forcibly within the bearing, as it has been described above, against the resilient deformation of the ribs 17, whereupon it is retained by the converging edges 17a, 17b, of the latter, which ensures the holding in position of the fixing member 3 which can thus rotate freely in its bearing.

One of the two extensions of the linear portion forming the rotation axis 4 is called "inner-extension" 6, and corresponds to the edge 8 of the annular member which is intended to be oriented towards the interior of the vehicle; it is provided at its free end with an elbow forming a hook 9 oriented toward the exterior and it is shaped in such a manner that the hook 9 can be engaged below the edge and bearing against it by virtue of the resiliency which prevails, on the one hand, in the zone of the elbow by which it is connected to the linear portion 4 and, on the otherhand, along its total length between the elbow and the hook 9; the hook 9 is thus situated across the interior edge 8 of the annular member; in this position, it maintains in position the totality of the fixing member in the locking position and prevents any rotation of the latter.

The other extension of the linear portion forming the rotation axis 4 is called "outer-extension" 7; it carries at its free end a bent portion oriented towards the central portion of the annular member and which preferably, terminates in a loop portion extending in a plane sustantially parallel to the plane of the edge 11 of the annular member to avoid any deterioration of the front glass of the optical unit against which it is intended, for the locking position, to bear in close resilient contact to provide for a safe fixing of the unit within the annular member 2, this resilient contact appearing in the same manner as described above with respect to the resiliency of the inner-extension between the rotation axis and its free end.

Of course, the outer-extension 7 is shaped and suitably bent so as to ensure the fixing when the hook 9 engages the edge 8.

It will be noted that in the prefered example shown notably in FIG. 1, the outer extension comprises starting from the axis of rotation 4, a first section 7a, bent substantially at right angle with respect to the axis, extended by a second section 7b, also bent at right angle, and sustantially perpendicular to the plane of the external edge 11, in such a manner that, in the locking position, the second section 7b, comes to bear against the outer edge 18 of the optical unit and constitutes thus a lateral holding and centering member for the optical unit with respect to the annular member.

According to another aspect of the invention, the necessary provision of the step 15 which is provided with the openings 16 and receives the ends of the ribs 17 permits to arrange the fixing and or adjusting means of the annular member with respect to the supporting bracket 25 in the following manner.

To this end, the step is provided with a diametral extension 20 extending oppositely from the centre of the annular member, this diametral extension comprising depressions 21 intended to receive the threaded portion 22 of the fixing and adjusting screws 28 whose head 24 comes into abutment against the exterior face of the step; the threaded portion 22 crosses the supporting bracket 25 through openings 26 beyond which it cooperates with locking nuts 27 (or 28 on FIG. 6), which constitute the fixing and or adjusting means for the annular member with respect the supporting bracket.

It will be noted, on FIG. 6, that the screws 23 are fixed to the annular member 2 by means of locking nuts 31 while a coil spring 30 is mounted around the threaded stem 22 so as to be clamped between the annular member 2a and the bracket 25 and that, beyond the bracket, the threaded stem cooperates with a butterfly nut 27. It is clear that by acting on the tightening of the nuts 27, it is possible to obtain the desired adjustment of the optical axis of the unit with respect to the main axis of the vehicle, the spring 30 acting by compression.

Conversely, on the same FIG. 6, there is provided a nonadjustable connection between the annular member 2b which is intended to receive an optical unit of a different kind than the unit mounted on annular member 2a, this non-adjustable connection being achieved by tightening of screws such as 23b cooperating with nuts such as 28. In such case, there is provided between the vehicle body and the bracket 25 orientation adjustment means which may be possibly of the same design as those which have been described in connection with the annular member 2, 2a.

It will be further noted that the annular member 2 which has been described above is remarkable in that its front wall 12 is provided, in the area of each diametral depression 20, with a cylindrical apperture 29 which opens towards the outer edge 11 of the annular member and is intended to accomodate the head 24 of the screw 23; If desired the cylindrical apperture 29 may have a non-circular section to prevent the rotation of the screw-head 25.

In addition, on FIG. 6, the component E which is shown on the exploded view is a component, known per se, provided for protection and aesthetic purposes and the provision of such a component, which is necessary in many cases, requires to design the whole set comprised of the optical unit, the annular member and the supporting brackets, in such a manner that the fixing and adjusting members of the optical unit must be accessed from the interior of the vehicle, which provides as an additionnal advantage that these parts are protected against projections of water and mud.

Besides, it is clear that the adjusting device of the annular member 2a introduces, owing to the provision of the coil springs 30, a certain degree of resiliency to the assembly formed by the annular member and the optical unit, this resiliency permitting to avoid the destruction of the front glass of the unit in case of a shock of small amplitude.

However, it is noted that this arrangement is not strictly necessary for the protection of the optical unit corresponding to the annular member 2b, this assembly beeing located substantially behind the other, and therefore less exposed to projection of water and mud.

Of course, the specific embodiment which has been shown and described may be the object of a great number of variants without departing from the scope of the invention.

By example, the term "annular member" which has been used to designate the member which receives the optical unit and carries the fixing and adjusting means of the latter, must not be interpreted as meaning that this member has necessarily a circular overall shape.

In fact, it could also have an oval, rectangular or even trapezoidal shape.

I claim:

1. In a vehicle headlight having an optical unit having an outer face and an outer edge, a support for said optical unit, comprising:
   an annular member having generally the shape of a truncated cup and comprising a peripheral portion, an internal face, an outer edge oriented towards the exterior of the vehicle, an inner edge oriented towards the interior of the vehicle, and a vertical axis;
   a plurality of bearings spaced along said peripheral portion of said annular member;
   means for mounting and dismounting said optical unit on said annular member comprising a plurality of members made of rigid and resilient wire spaced along said peripheral portion of said annular member, each of said members comprising:
   a linear portion engaged in a corresponding one of said plurality of bearings, said linear portion forming an axis of rotation substantially parallel to said vertical axis of said annular member; and
   an inner extension and an outer extension, said inner and outer extensions each having a first end extending from either end of said linear portion and a second, free end, said inner and outer extensions being bent transversely to said linear portion and being substantially coplanar with said linear portion, said inner extension corresponding to said inner edge of said annular member and having a locked position and an unlocked position, said second end of said inner extension including an elbow forming a hook opening towards the exterior of the vehicle, said hook being positioned to be engaged below and to be locked resiliently against said inner edge of said annular member when said inner extension is in said locked position, said outer extension having a locked position and an unlocked position corresponding to said locked and unlocked positions of said inner extension and having at its second end a bent portion opening towards said vertical axis of said annular member and being shaped so as to be in close contact with the outer face of the optical unit when said outer extension is in said locked position.

2. A support according to claim 1, said inner and outer extensions extending on the same side of said linear portion.

3. A support according to claim 1, wherein in said locked position of said inner extension, said elbow of said inner extension engages said inner edge of said annular member and said hook is applied against the portion of said internal face of said annular member which is adjacent to said inner edge.

4. A support according to claim 1, each of said inner and outer extensions being connected to said linear portion by a curved portion, and being shaped to obtain their respective locked positions against a resilient deformation occurring both along their length and along said curved portions.

5. A support according to claim 1, wherein said outer extension comprises a first section adjacent said first end thereof bent at a substantially right angle to said linear section, and a second section connected to said first section bent substantially perpendicular to said first section, said first and second sections being shaped so that when said outer extension is in said locked position, said second section bears against the outer edge of the optical unit, thereby laterally holding and centering the optical unit with respect to said annular member.

6. A support according to claim 1, wherein said annular member further comprises a front wall adjacent to said outer edge thereof, said front wall having an internal face, a rear wall adjacent to said inner edge thereof, a diametral wall portion forming a step connecting said front and rear walls, said step having an inner face and an outer face, the perimeter of said front wall adjacent said outer edge of said annular member being larger than the perimeter of said second wall adjacent to said diametral wall, said front wall having an internal face, a plurality of openings formed in said step, and a plurality of pairs of ribs, one rib of each said pair of ribs being formed on said internal face of said front wall on either side of one of said openings, each said pair of ribs and corresponding one of said openings defining one of said bearings.

7. A support according to claim 6, wherein said ribs of each of said pair of ribs converge slightly towards each other in such a manner that said linear portion can be forcibly engaged against the resilient deformation of said pair of ribs within said bearing defined by said pair of ribs.

8. A support according to claim 6, said step including pairs of diametrically opposed diametral depressions formed therein, and said support further comprising:
   a plurality of fixing and adjusting screws, each of said screws having a threaded portion and a head, said threaded portion of each of said fixing and adjusting screws being received in one of said diametral depressions;
   a supporting bracket having apertures therethrough and having an inner face and an outer face; and
   a plurality of tightening nuts;

said heads of said fixing and adjusting screws abutting said outer face of said step, said threaded portions of said fixing and adjusting screws passing through said apertures in said supporting bracket, and each of said tightening nuts cooperating with said threaded portion of one of said fixing and adjusting screws at said inner face of said supporting bracket to fix said annular member to said supporting bracket.

9. A support according to claim 8, wherein said front wall of said annular member includes in the vicinity of each of said diametral depressions, a cylindrical aperture opening towards said outer edge of said annular member, each said cylindrical aperture accommodating said head of one of said fixing and adjusting screws.

10. A support according to claim 8, further comprising a plurality of coil springs, each of said coil springs being engaged around said threaded portion of one of said screws and interposed between said supporting bracket and a portion of the body of the vehicle, and a plurality of adjusting nuts, each of said adjusting nuts cooperating with one of said fixing and adjusting screws and one of said coil springs for adjusting the slope of said vertical axis.

11. A support according to claim 10, wherein said front wall of said annular member includes in the vicinity of each of said diametral depressions, a cylindrical aperture opening towards said outer edge of said annular member, each said cylindrical aperture accommodating said head of one of said fixing and adjusting screws.

12. A support according to claim 6, said step including pairs of diametrically opposed diametral depressions formed therein, and said support further comprising:

a plurality of fixing and adjusting screws, each of said screws having a threaded portion and a head, said threaded portion of each of said fixing and adjusting screws being received in one of said diametral depressions;
a supporting bracket having apertures therethrough and having an inner face and an outer face;
a plurality of tightening nuts;
a plurality of coil springs; and
a plurality of adjusting nuts;
said heads of said fixing and adjusting screws abutting said outer face of said step, said threaded portions of said fixing and adjusting screws passing through said apertures in said supporting bracket, and each of said tightening nuts cooperating with said threaded portion of one of said fixing and adjusting screws at said inner face of said step to fix said fixing and adjusting screws to said annular member, each of said coil springs being engaged around said threaded portion of one of said fixing and adjusting screws and interposed between said outer face of said supporting bracket and said annular member, and each of said adjusting nuts bearing against said inner face of said supporting bracket and cooperating with one of said fixing and adjusting screws for adjusting the slope of said vertical axis, said supporting bracket being solid with the vehicle.

13. A support according to claim 12, wherein said front wall of said annular member includes in the vicinity of each of said diametral depressions, a cylindrical aperture opening towards said outer edge of said annular member, each said cylindrical aperture accommodating said head of one of said fixing and adjusting screws.

* * * * *